United States Patent [19]
McMullin et al.

[11] Patent Number: 4,920,802
[45] Date of Patent: May 1, 1990

[54] ULTRASONIC CHECK VALVE INSPECTION

[75] Inventors: Craig W. McMullin; John E. Rosenberger, both of Granby, Conn.; Paul J. Hijek, Windsor Locks, Conn.; and Shahab S. Negahban, Lewiston, Penn.

[73] Assignee: Combustion Engineering, Inc., Windsor, Conn.

[21] Appl. No.: 229,788

[22] Filed: Aug. 5, 1988

Related U.S. Application Data

[63] Continuation of Ser. No. 27,527, Mar. 18, 1987, abandoned.

[51] Int. Cl.⁵ .............................................. G01B 17/00
[52] U.S. Cl. ......................................... 73/597; 73/168
[58] Field of Search ................... 73/597, 168; 367/99; 137/554; 376/245, 252

[56] References Cited
U.S. PATENT DOCUMENTS 3,455,532  7/1969  Barker ................................. 251/29
4,543,649  9/1985  Head et al. ........................... 367/99
4,678,621  7/1987  Callaghan et al. .

FOREIGN PATENT DOCUMENTS 2478255  9/1981  France ................................. 137/554
1525720  9/1978  United Kingdom .................. 367/99

Primary Examiner—Jerry W. Myracle
Attorney, Agent, or Firm—Chilton, Alix & Van Kirk

[57] ABSTRACT

The disclosed method includes the steps of positioning an ultrasonic transmitter (50, 52) on the exterior body portion (54) of the valve (14), oriented so that the transmitted ultrasonic wave intercepts the path (46) of the closure member (30) at least at one location, and positioning an ultrasonic receiver on the body portion oriented to detect reflected ultrasonic waves when the closure member passes through such location. The valve body (20) is filled with water and the closure member is caused to move along the path. The transmitter and receiver are operated to generate an output signal trace (64) commensurate with the magnitude of the ultrasonic wave reflected from the closure member at the targeted locations along the path.

16 Claims, 4 Drawing Sheets

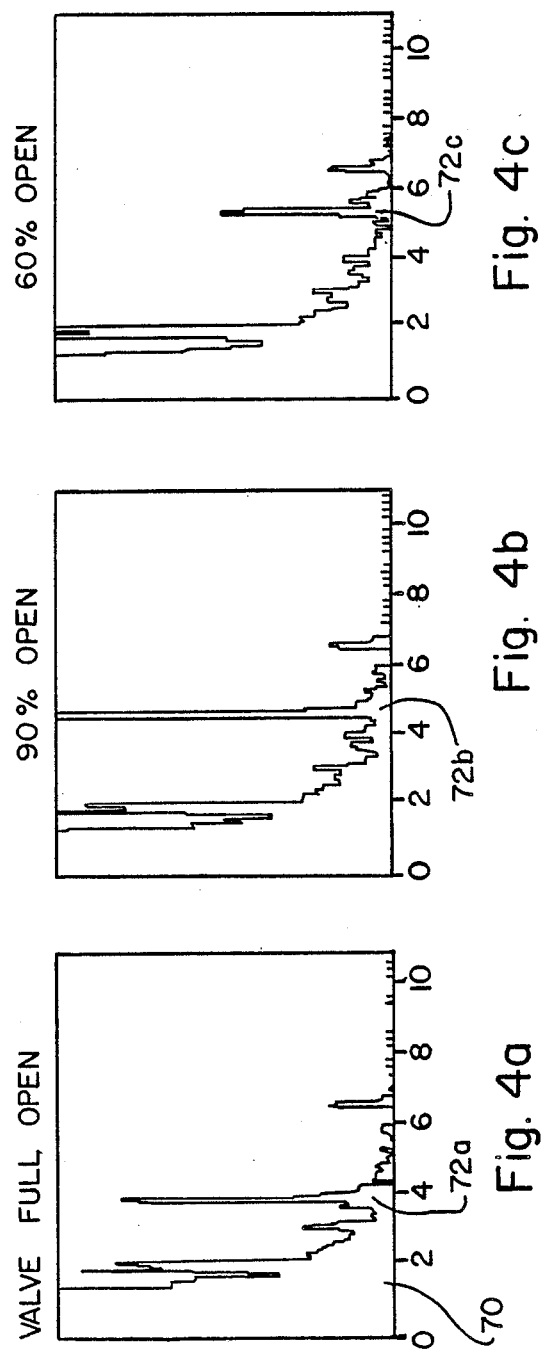

ULTRASONIC CHECK VALVE INSPECTION

This is a continuation of co-pending application Ser. No. 027,527 filed on Mar. 18, 1987 now abandoned.

BACKGROUND OF THE INVENTION

The present invention pertains to valve inspection, and more particularly, to an in-line inspection technique that provides a simple, non-intrusive verification of check valve operability without valve disassembly.

Conventionally, in process industries such as power plants and the like, the operability of check valves is verified during planned outages, by disassembling the valve, inspecting the valve components, and then reassembling the valve. Particularly in nuclear power plants, this conventional procedure has many disadvantages. The major disadvantage is that the valve to be inspected is itself often radioactive, or it contains residues of radioactive fluid. The typical time required for conventional verification is on the order of several hours, during which the maintenance worker may be exposed to, or must be protected from, radiation. In addition, there exists some risk that the valve will not be correctly reassembled, which could adversely affect valve performance.

Thus, the need exists for a reliable, non-intrusive, in-line check valve inspection technique for verifying valve operability.

SUMMARY OF THE INVENTION

The present invention satisfies this need in accordance with a method in which one or more ultrasonic transducers are positioned on the valve body, to generate output traces that can confirm whether the closure member in the valve can be caused to move as expected.

More particularly, the invention includes the steps of positioning an ultrasonic transmitter on the exterior body portion of the valve, oriented so that the transmitted ultrasonic wave intercepts the path of the closure member at least at one location, and positioning an ultrasonic receiver on the body portion oriented to detect reflected ultrasonic waves when the closure member passes through such location along the path. The valve body is filled with water and the closure member is caused to move along the path. The transmitter and receiver are operated to generate an output signal trace commensurate with the magnitude of the ultrasonic wave reflected from the closure member at the targeted locations along the path.

The invention is especially well-suited for verifying the range of motion of the closure member on check valves, which normally do not include position indicators. In a swing-type check valve, two transmitters and associated receivers are preferably used, oriented at right angles to each other. One is positioned next to the valve seat, transverse to the flow direction, and the other is positioned on the valve surface closest to the fully open position of the closure member, facing the valve seat.

Once an ultrasound technician has been trained to use the technique of the present invention, only about one-half hour is require to verify operation of a typical check valve. Also, since the valve is not disassembled, the maintenance and operability uncertainty associated with proper valve reassembly is eliminated.

BRIEF DESCRIPTION OF THE DRAWINGS

The preferred embodiments and the best mode for carrying out the invention will be described below with reference to the accompanying drawings, in which:

FIGS. 4a through 4f are reproductions of output traces from a second transducer located in accordance with another embodiment of the invention, for the closure member in a range of positions between fully open and fully closed.

DESCRIPTION OF THE PREFERRED EMBODIMENT

Figure 1:
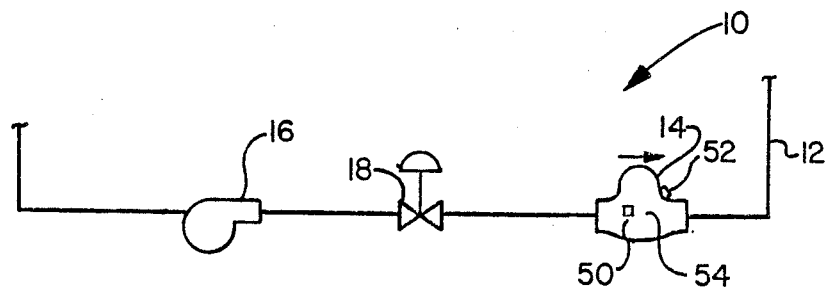
FIG. 1 is a schematic diagram of a portion of a piping system containing a valve to be inspected in accordance with the present invention.

FIG. 1 schematically illustrates a portion of a process 10 including a fluid line 12 in which are located a check valve 14, the operation of which is to be verified, a pump 16 and a control valve 18.

Figure 2:
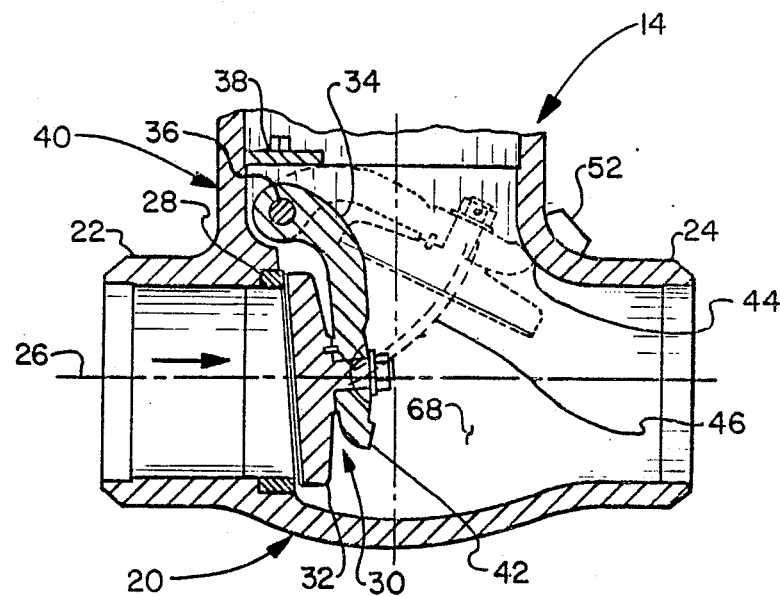
FIG. 2 is a side view, in section, of a swing check valve and associated transducers for verifying operability in accordance with the invention.

FIG. 2 illustrates in section the internals of a typical check valve 14. A valve body 20 includes an inlet 22 and an outlet 24 which are aligned about a flow axis 26. At the interior end of the inlet 22 a ring valve seat 28 is provided for interacting with a closure member 30 in one of two modes. When the valve is open for flow in the permitted flow direction, the closure member 30 must be spaced away from the seat 28, thereby permitting full flow through the valve. In the event a reverse flow begins through the valve, the closure member 30 must seal against the valve seat 28 to prevent reverse flow through the inlet 22.

The closure member 30 includes a disk portion 32 adapted for sealing engagement with the seat 28. The disk 32 is carried by swing arm 34 which is pivoted at 36 to a yoke 38. The yoke is rigidly supported at the lower portion of valve bonnet 40. When flow in the permitted direction is initiated, the arm 34 swings upward until the land surface 42 thereof contacts the valve housing interior at the convex juncture 44 of the bonnet 40 and body portion 20. The disk 32 thus has an arc path of motion indicated at 46 between a fully closed position and the fully open position shown in phantom.

One of the causes of check valve misoperation is the sudden, high pressure initiation of flow in the permitted direction through the valve. The force with which the closure member 30 swings away and contacts the convex surface 44 is so great that the arm 34 or pivot 36 are bent or otherwise damaged with the closure member 30 sticking in the upward position or having only limited freedom of movement. It is this type of anomaly which the present invention is intended to identify.

According to the present invention, at least a pair of ultrasonic transmitters and receivers are attached to the exterior of the valve body as part of the verification procedure to be more fully described below. In the preferred embodiment, a first transmitter/receiver pair 50 is positioned adjacent disk 32 when the disk 32 is in the fully closed position (FIGS. 1 and 2). The wave transmitted from the transducer 50 is in a direction generally transverse to the permitted flow direction through the inlet 22. A second transducer pair 52 is attached to the valve exterior and oriented so that the transmitted wave is generally parallel to the path of motion 46 of the disk 32, in a direction perpendicular to the transmitted wave of the first transducer 50. In the illustrated embodiment, the second transmitter is located in the concave portion of the juncture 44, which coincides with the closest surface of the valve relative to the fully open position of the disk 32.

Preferably, the transducers are of a type commonly available, in which the transmitter and receiver are embodied in a single housing but this is not necessary. Suitable transducers include a 2.25 MHz dual contact transducer and 45 degree angle beam transducer with Lucite wedge connected to an ultrasonic pulser receiver model EPOCH-2000 compact field unit available from the Parametrics Company of Boston, Mass.

It should be appreciated that before the transducer can be attached to the valve exterior, any insulation or other obstructions must be removed from the exterior surface of the valve. The transducers must be in direct contact with the valve body to ensure proper transmission of sound waves through the valve. For similar reasons, the valve must be filled with a liquid, preferably water, that is a satisfactory medium for transmitting sound waves at typical ultrasonic frequencies. The liquid may in many situations be the process liquid available in line 12, or a separate, auxiliary test line with water (not shown) can be utilized during the verification procedure. The procedure requires that the person performing the test be able to apply actuating pressure sufficient to selectively move the disk 32 between the full open and full closed position, preferably with the ability to maintain the disk stationary in an intermediate position. This control can be provided by flow control valve 18, or a similar device utilized in connection with an auxiliary test line.

In a first embodiment of the invention, the first transducer 50 is located at a stationary position as shown in FIG. 1 on the near wall 54 (the portion that is above the plane of the paper and thus is not shown in FIG. 2). The second transducer 52 need not be present. With the first embodiment, verification is made that the disk 32 is freely movable between a closed position adjacent the valve seat 28 and an open position spaced away from the valve seat. It should be understood that this verification is only a gross indicator that the arm is free to swing through at least most of the path 46. The verification does not necessarily show that the valve closure member is operable between the fully closed and fully open limits of the path 46.

FIG. 3 shows a signal trace 56, generated by the first transducer 50 in accordance with the first embodiment. The vertical axis 58 corresponds to reflected wave amplitude and the horizontal axis 60 is the time delay between the transmittal of the wave and the receipt of the reflected wave. When the closure member 30 is at the valve seat 28, the first transducer 50 generates a trace 56 in which the initial reflection 62 is due to the valve near wall 54 on which the transducer is mounted. The peak 64 represents the wave reflected from the disk 32. Other, smaller peaks are reflections from other structures within the body and are to be ignored. The peak at 66 represents the wave reflected from the back wall 68 on the other side of the valve body (FIG. 2). The technician operating the equipment can more easily interpret the traces by having a drawing of the valve interior, but it is within the ordinary skill of ultrasound technicians to set up and operate the equipment and interpret the traces in accordance with the teachings herein.

Figure 3B:
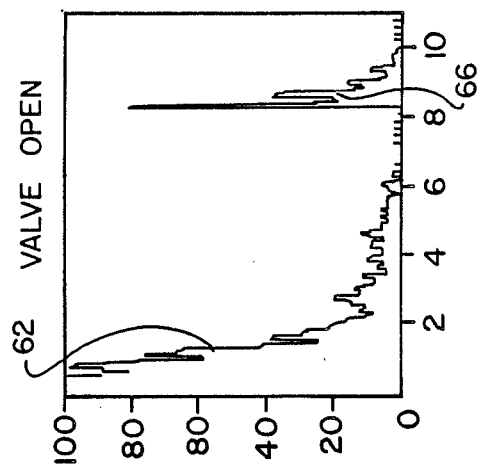
FIGS. 3a and 3b are reproductions of output traces from a first transducer located in accordance with one embodiment of the invention, for the closure member in the closed and fully open positions, respectively.
Figure 3A:
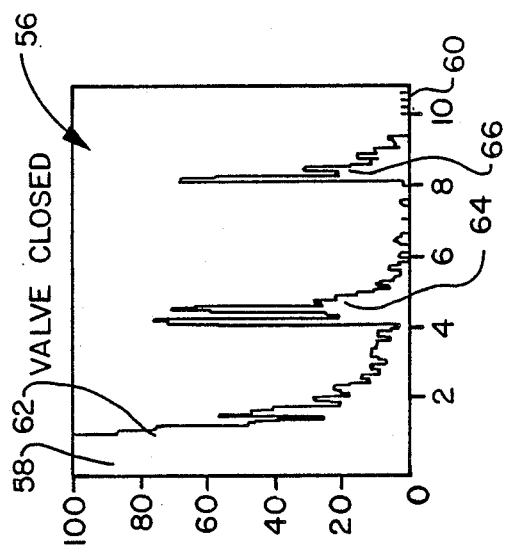

In FIG. 3b, it may be seen that the peak 64a associated with the disk 32 in FIG. 3a is absent, indicating that the disk moved a substantial distance along the path 46 and is spaced a significant distance away from the valve seat 28. The technician can observe the transition between the conditions illustrated in FIGS. 3a and 3b by controlling the flow rate through the valve 14 in small increments between zero and the flow rate for which the valve was designed to open fully.

If a particular valve is tested annually or on a regular schedule, the traces can be saved and compared from inspection to inspection, to identify discrepancies after taking into account differences in test equipment and other uncertainties. Also, a given valve type would have a characteristic trace in the open and closed conditions which may be utilized to interpret the traces for a particular valve of that type installed in the field.

In a second embodiment, the second, stationary transducer 52 alone could be used for obtaining traces of the reflection of the disk 32 as the disk is moved between a fully opened and a fully closed position using the valve 18 or other flow control device upstream of the check valve 14. FIGS. 4a–4f represent traces from a second transducer mounted as shown in FIG. 2.

Figure 4F:
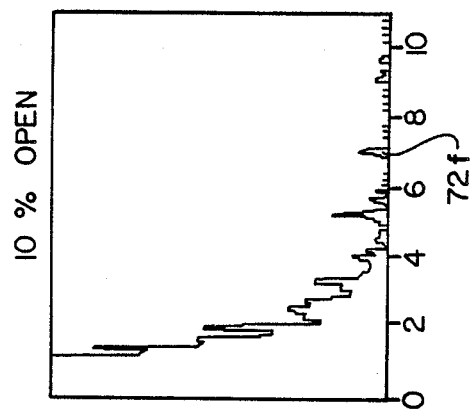
Figure 4E:
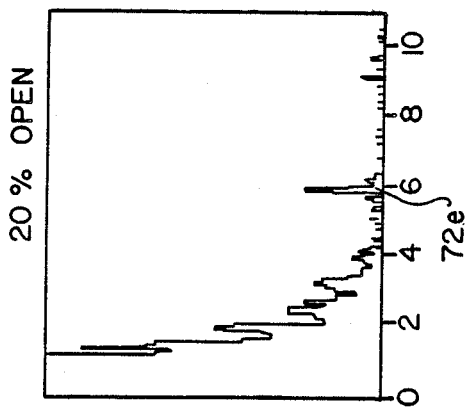
Figure 4D:
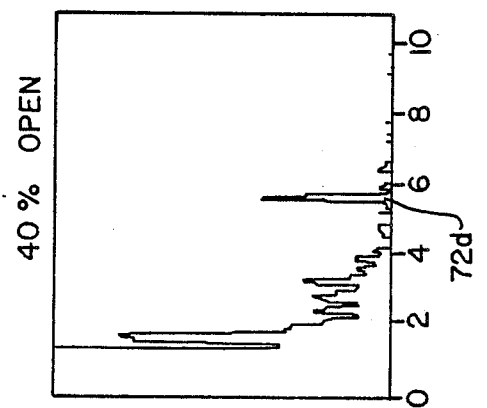

In FIG. 4a the initial reflection 70 is visible as a thick reflection at a time delay of about one unit and the disk reflection 72a is observed at approximately 3½ time units. With the valve in the 90% open position as shown in FIG. 4b, the spike 72b due to reflection of the disk has moved to about 4½ time units. Similarly, as the disk is moved from the fully open to the fully closed position (FIGS. 4a–f), the disk reflection 72a through 72f is delayed longer and longer so that, when the valve is open less than 10%, the reflected delay 72f is at approximately seven time units. As mentioned above, the traces are continuously visible on the operator's oscilloscope so that the movement of the disk spike 72 would be unmistakeable.

In a third embodiment of the invention, both transducers 50, 52 are utilized. The first transducer 50 is positioned initially as in the first embodiment adjacent the valve seat on the valve body surface and the second transducer is positioned on the exterior surface closest to the fully open position of the disk. In this embodiment, however, the first transducer 50 is moved along the body parallel to the arc of path 46 of disk 32 in increments corresponding to incremental positions of the disk 32 along path 46. The incremental positions of the disk 32 are controlled by the valve 18.

By correlating the trace between the first and second transducers in this embodiment, a more complete and reliable analysis can be made of the limit positions of the disk resulting from the maximum and minimum flow rates produced through the valve by means of the pump 16 and control valve 18. The operator can thus more easily distinguish between an operable valve and defective valve in which the disk is free to move but with only limited movement. Also, since it is important that the check valve disk 32 not "flutter", it is desirable that it have only two modes of operation, i.e. fully closed or fully open. By using the present invention, it may be determined with reasonable accuracy what flow rate will move the disk into the fully opened position.

Although the present invention as described above cannot unequivocally verify that the check valve will not experience small leaks when a high back pressure is applied from the outlet 24 to the inlet 22, it will satisfactorily identify problems which would lead to a significant backflow. It should also be understood that other combinations of stationary and movable transducers are also within the scope of the invention.

We claim:

1. A method of inspecting the operability of a check valve situated in a process plant flow line for operation under plant process conditions, the valve having a body, a flow bore through the body, a seat associated with the flow bore, and a closure member pivotally mounted to swing on a path in the body between a closed position against the seat and a fully open position spaced from the seat in response to plant process flow in the line in reverse and forward flow directions respectively, comprising the steps of:

operating flow control means in the process plant flow line upstream of the valve to establish a valve inspection mode of operation;

during the inspection mode of operation, manually positioning and aiming an ultrasonic transmitter on the body exterior oriented so that the transmitted ultrasonic signal passes through the body and intercepts the path of the member at least at one location;

during the inspection mode of operation, manually positioning and aiming an ultrasonic receiver on the body exterior oriented to detect ultrasonic signals reflected from the body and the member when the member is on said at least one location along said path;

filling the valve body with fluid capable of transmitting ultrasonic signals;

during the inspection mode of operation, operating the flow control means to induce the closure member to move along the path;

operating the transmitter and receiver to transmit an output signal commensurate with the magnitude of the ultrasonic signal reflected from the closure member as the member moves relative to said at least one location;

from the output signal, diagnosing at least one operating characteristic of the valve member associated with said path, selected from the group of characteristics consisting of range of closure member motion, closure member position versus flow rate, and susceptibility to closure member flutter; and removing the transmitter and receiver from the body.

2. The method of claim 1 wherein the steps of positioning the transmitter and receiver include the steps of, mounting the transmitter so that the transmitter ultrasound wave is generally parallel to said path, in a direction from the open to the closed position of the closure member.

3. The method of claim 2 wherein the valve has a bonnet and the closure member has a pivot point in the bonnet, and wherein the step of positioning said transmitter includes the step of mounting the transmitter on the surface of the body portion closest to the closure member when the closure member is fully open.

4. The method of claim 3, wherein said surface is at the juncture of the bonnet portion and the body portion, opposite the pivot.

5. The method of claim 3, wherein the transmitter and receiver are housed in a single transducer.

6. The method of claim 1, wherein the step of inducing the closure member to move along the path includes the steps of holding the closure member in the closed position for a preselected duration, moving the closure member to an intermediate position and holding this position for a preselected duration, and moving the closure member to the full open position and holding this position for a preselected duration.

7. The method of claim 1 wherein the step of positioning the transmitter includes positioning two transmitters at substantially right angles to each other.

8. The method of claim 7, wherein both transmitters are stationary, the first transmitter being located on the body portion surface adjacent the valve seat and at right angles to the flow direction through the seat, and the second transmitter being located on the body portion surface closest to the fully open position of the closure member.

9. The method of claim 1 wherein the step of positioning the transmitter includes the steps of mounting the transmitter so that the transmitted ultrasound wave is generally perpendicular to said path.

10. The method of claim 1 wherein said at least one location includes the closed position against the seat.

11. The method of claim 2 wherein the step of generating an output signal includes generating a trace commensurate with the magnitude of the ultrasonic signal reflected from the closure member and the body as the member moves.

12. The method of claim 1 wherein, the step of inducing the closure member to move includes,
    applying a first inspection mode differential pressure across the closure member selected on the basis of the differential pressure at which the closure member is designed to be in the closed position,
  applying at least a second inspection mode differential pressure across the closure member selected on the basis of the differential pressure at which the closure member is designed to be open, and
  the step of determining at least one operating characteristic includes determining at least one of the characteristics of,
    the differential pressure at which the closure member opens, and
    the relationship between the extent of movement of the closure member and the magnitude of the differential pressure.

13. A method of inspecting the operability of a valve of the type having a body portion including an inlet and an outlet, a bonnet portion, a seat surrounding the inner end of the inlet and a closure member movable on the path in the body portion between a closed position against the seat and an open position spaced from the seat, comprising the steps of:

manually positioning and aiming an ultrasonic transmitter on the body portion oriented so that the transmitted ultrasonic signal intercepts the path of the closure member at least in one location;

manually positioning and aiming an ultrasonic receiver on the body portion oriented to detect ultrasonic signals from said at least one location along said path;

filling the valve body with fluid capable of transmitting ultrasound waves;

applying pressure to induce the closure member to move along the path;

operating the transmitter and receiver to generate an output signal trace commensurate with the magnitude of the ultrasonic wave reflected from the closure member at least at said one location;

wherein the step of applying pressure to cause the closure member to move along the path includes the steps of holding the closure member in the closed position for a preselected duration, moving the closure member to an intermediate position and holding this position for a preselected duration, and moving the closure member to the full open position and holding this position for a preselected duration; and wherein the steps of positioning the transmitter and receiver include the steps of relocating the transmitter and receiver on the body portion each time the closure member is moved, to the body portion surface closest to the closure member.

14. A method of inspecting the operability of a check valve of the type having a body portion including an inlet and an outlet, a bonnet portion, a seat surrounding the inner end of the inlet and a closure member movable on a path in the body portion between a closed position against the seat and an open position spaced from the seat, comprising the steps of:

manually positioning and aiming an ultrasonic receiver on the body portion oriented so that the transmitted ultrasonic signal intercepts the path of the closure member at least in one location;

manually positioning and aiming an ultrasonic receiver on the body portion oriented to detect ultrasonic signals from said at least one location along said path;

filling the valve body with fluid capable of transmitting ultrasound waves;

applying pressure to induce the closure member to move along the path; and operating the transmitter and receiver to generate an output signal trace commensurate with the magnitude of the ultrasonic wave reflected from the closure member at least at said one location;

wherein the positioning steps include positioning two transmitters at substantially right angles to each other and moving one transmitter along the body portion surface closest to the closure member as the member moves along the path, and maintaining the other transmitter stationary.

15. The method of claim 14 wherein the step of generating an output signal trace includes the steps of generating a first output trace for the first transmitter and associated receiver, that is calibrated to show the reflected pulses from the near wall of the body portion, the far wall of the body portion, and the closure member, and generating a second output trace for the second transmitter and associated receiver that is calibrated to show the time delay in the receipt of the portion of the wave reflected from the closure member as the closure member is moved along said path.

16. A method of inspecting the operability of a check valve of the type having a body portion including an inlet and an outlet, a bonnet portion, a seat surrounding the inner end of the inlet and a closure member movable on a path in the body portion between a closed portion spaced from the seat, comprising the steps of:

manually positioning and aiming an ultrasonic transmitter on the body portion oriented so that the transmitted ultrasonic signal intercepts the path of the closure member at least in one location;

manually positioning and aiming an ultrasonic receiver on the body portion oriented to detect ultrasonic signals from said at least one location along said path;

filling the valve body with fluid capable of transmitting ultrasound waves;

applying pressure to induce the closure member to move along the path;

operating the transmitter and receiver to generate an output signal trace commensurate with the magnitude of the ultrasonic wave reflected from the closure member at least at said one location;

wherein the positioning steps include positioning two transmitters at substantially right angles to each other, both said transmitters remaining stationary, the first transmitter being located on the body portion surface adjacent the valve seat and at right angles to the flow direction through the seat, and the second transmitter being located on the body portion surface closest to the fully opened position of the closure member; and wherein the step of generating an output trace includes the steps of generating a first output trace for the first transmitter and associated receiver, that is calibrated to show the reflected pulses from the near wall of the body portion, the far wall of the body portion, and the closure member, and generating a second output trace for the second transmitter and associated receiver that is calibrated to show the time delay in the receipt of the portion of the wave reflected from the closure member as the closure member is moved along said path.

* * * * *